W. J. EVANS.
AUTOMOBILE ATTACHMENT.
APPLICATION FILED SEPT. 20, 1912.
1,073,971.
Patented Sept. 23, 1913.
2 SHEETS—SHEET 2.
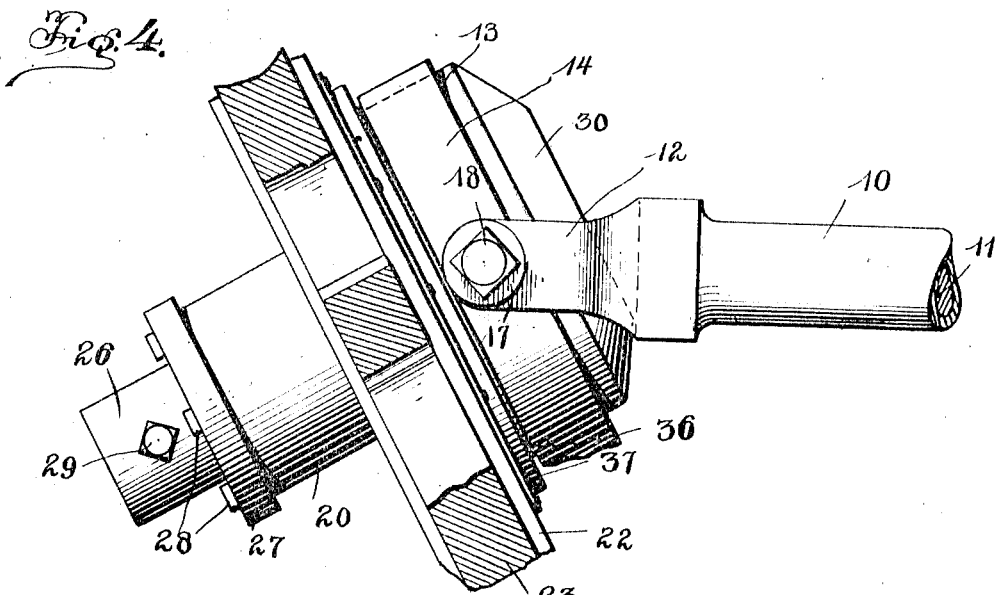
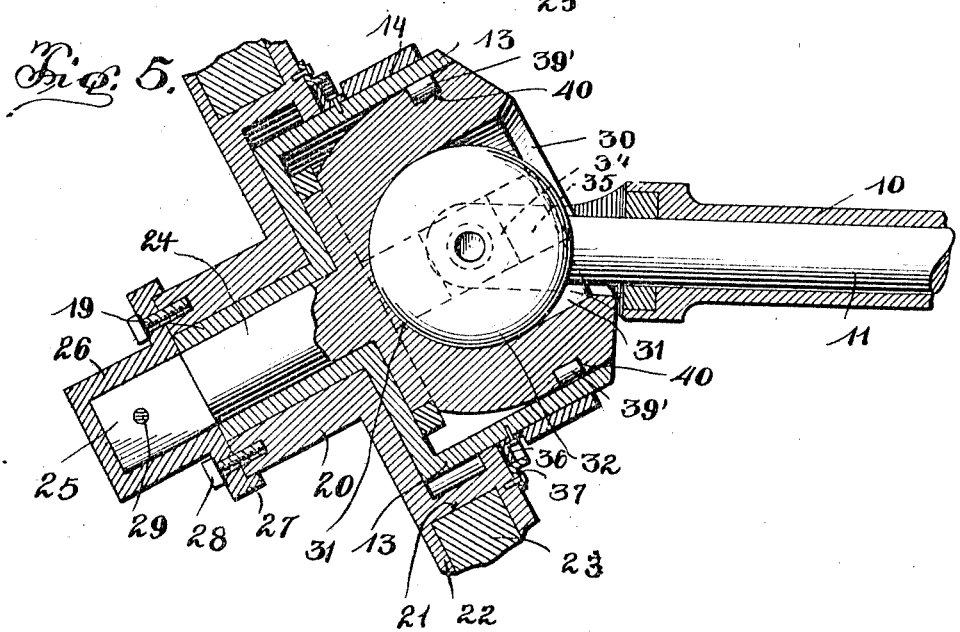
Witnesses
Ernest Craker
Inventor
W. J. Evans.
By Victor J. Evans
Attorney

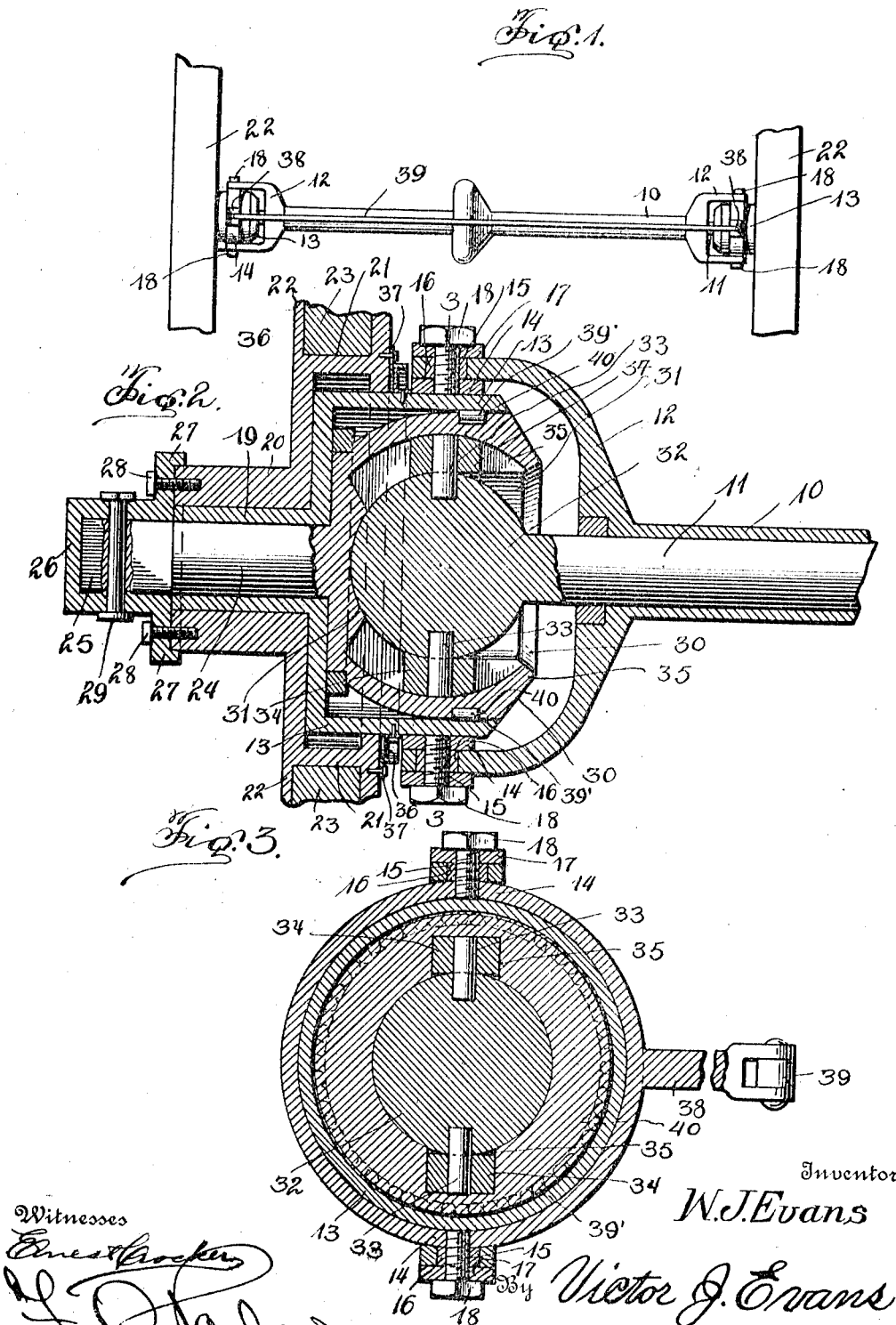

UNITED STATES PATENT OFFICE.

WILLIAM J. EVANS, OF LINNBURG, IOWA.

AUTOMOBILE ATTACHMENT.

1,073,971.   Specification of Letters Patent.   Patented Sept. 23, 1913.

Application filed September 20, 1912. Serial No. 721,431.

*To all whom it may concern:*

Be it known that I, WILLIAM J. EVANS, a citizen of the United States, residing at Linnburg, in the county of Webster and State of Iowa, have invented new and useful Improvements in Automobile Attachments, of which the following is a specification.

The invention relates to driving mechanism for motor vehicles and more particularly to the class of steering mechanism for automobiles or the like.

The primary object of the invention is the provision of mechanism of this character wherein the steering wheel of the automobile, motor vehicle or the like will be positioned contiguous to the turning axis of the supporting spindle or the turning knuckle thereby enabling the center of the wheel to be nearer to the pivot point of the knuckle or spindle thus assuring a shorter revolution to the steering mechanism.

Another object of the invention is the provision of a mechanism of this character in which the steering wheel of a motor vehicle or the like will be turned in the ordinary well known manner and which will enable the said wheel to be driven from the motor or other driving power of the machine thereby permitting both the front and rear wheels to be driven.

A still further object of the invention is the provision of a mechanism of this character in which the steering wheel is supported in a novel manner, whereby the same may be readily and conveniently turned for the guiding of the motor vehicle as well as permitting the advancement of the same.

A still further object of the invention is the provision of a mechanism of this character in which the front steering wheel may be driven irrespective of the angular disposition thereof and will permit the ready and easy turning of the wheel to the desired angular position.

A still further object of the invention is the provision of a mechanism which is simple in construction, strong, thoroughly reliable and efficient in its purpose and inexpensive in manufacture.

With these and other objects in view the invention consists in the construction, combination and arrangement of parts as will be hereinafter more fully described, illustrated in the accompanying drawings, and pointed out in the claims hereunto appended.

In the drawings: Figure 1 is a fragmentary front elevation of an axle showing a steering wheel constructed therewith in accordance with the invention. Fig. 2 is an enlarged fragmentary vertical sectional view through the same. Fig. 3 is a sectional view on the line 3—3 of Fig. 2. Fig. 4 is a fragmentary top plan view showing the spindle in shifted position. Fig. 5 is a horizontal sectional view thereof.

Similar reference characters indicate corresponding parts throughout the several views in the drawings.

Referring to the drawing by numerals 10 designates a portion of a tubular stationary front axle of an automobile, vehicle or the like, and 11 the driving shaft, the same being journaled in the axle in any preferred manner. Formed on the end of the stationary axle 10 are laterally extending arms 12 between which is arranged a steering knuckle 13 which is in the form of a cylindrical body and has fitted exteriorly thereon an annular band 14 the latter being preferably shrunk upon the body and has detachably fitted therein at diametrically opposite points of the same pivot pins 15 the same being passed through sleeves 16 loosely engaged in the arms 12, the said sleeve 16 being held between the said pivot pins 15, the 17 supporting the said pivot pins 15, the washers being designed to work against the heads 18 of the pins 15 and also work against the outer sides of the arms 12 as shown.

The steering knuckle 13 further has formed thereon a supporting sleeve 19 on which the hub 20 of the wheel 22 rests, the hub being formed with an inturned annular flange 21 adapted to overhang a portion of the body of the knuckle 13 and this flange is provided with spoke sockets 22 in which are fitted the spokes 23 of the said wheel.

Extending through the supporting sleeve 19 is a rotatable spindle 24 the outer end of which is formed a squared portion 25 which engages a correspondingly squared socket formed in a removable cap 26 the latter being provided with an annular flange 27 which is fastened at 28 or otherwise secured to the outer end of the hub 20 so that upon rotation of the spindle 24 the said hub will rotate therewith. To more securely fasten the cap 26 to the spindle 24 there is passed through the said cap a transverse bolt member 29 the same being also passed through the outer squared portion 25 of the spindle so that the said hub will be securely held upon the supporting sleeve 19 for rotation thereon when the spindle is driven in a manner presently described.

Formed on the inner end of the spindle 24 is a substantially semi-spherical shaped boxing 30 rotatably mounted within the knuckle 13 the boxing being formed with a substantially spherical shaped ball socket 31 in which is loosely engaged a ball terminal 32 formed on the outer end of the driving shaft 11 adjacent to the said spindle 24, the ball terminal being formed with diametrically opposed outwardly extending lugs or pins 33 on which are rotatably engaged slide blocks 34 the latter movably engaged in a groove or raceway 35 formed in the wall of the socket 31 so that the knuckle 13 may be turned at various angles without interfering with the driving connection between the boxing 31 and the ball terminal 32 on the driving shaft. It will be seen that the slide blocks 34 will move in the groove or raceway 35 in the said socket 31 when the knuckle 13 is angularly fastened, and that the said driving shaft 11 will be positively connected with the spindle 24 for the rotation thereof.

Mounted exteriorly on the knuckle 13 is a guard ring 36 while mounted on the inner side of the hub 20 is a further guard ring 37 adapted to overhang the guard ring 36 and thereby form a dust and dirt proof joint between the knuckle and hub. Integral with and projecting from the knuckle 13 is an arm 38 to which is adapted to be pivotally connected a union rod 39 of the ordinary well known construction and this arm is also suitably connected with a steering wheel (not shown) so that the front wheels can be turned for the guiding of the vehicle as usual.

It is of course understood that the driving shaft 11 is actuated in any ordinary well known manner, that is to say, from an engine (not shown) supported within the body of the vehicle.

Mounted in the inner side of the knuckle 13 at diametrically opposite points thereof are roller bearings 39 the same engaging in a raceway 40 formed in the outer side of the boxing 30 and in this manner the said boxing is presented against end thrust, that will be clearly apparent.

From the foregoing, taken in connection with the accompanying drawings it is thought that the construction and operation of the invention will be readily understood, and therefore a more extended explanation has been omitted.

What is claimed is:—

1. The combination with a stationary axle having a forked end, of a driving shaft journaled in said axle and having a ball terminal, a hollow knuckle detachably pivoted in said forked end for swinging movement and having a sleeve, a wheel hub rotatably journaled upon said sleeve and having a socket receiving a portion of the knuckle whereby the hub will extend in close proximity to the pivot connection of the said knuckle with the forked end, a spindle journaled in the sleeve and having connection with the said hub, a box integrally formed with the spindle and rotatably mounted within the knuckle for receiving the ball terminal, the said boxing being provided with an external annular groove, bearing rollers disposed in said groove and working against the inner wall of the knuckle, and a joint connection between the boxing and the said ball terminal.

2. The combination with a stationary axle having a forked end, of a driving shaft journaled in said axle and having a ball terminal; a hollow knuckle detachably pivoted in said forked end for swinging movement and having a sleeve, a wheel hub rotatably journaled upon said sleeve and having a socket receiving a portion of the knuckle whereby the hub will extend in close proximity to the pivot connection of the said knuckle with the forked end, a spindle journaled in the sleeve and having connection with said hub, a box integrally formed with the spindle and rotatably mounted within the knuckle for receiving the ball terminal, the said boxing being provided with an external annular groove, bearing rollers disposed in said groove and working against the inner wall of the knuckle, a joint connection between the boxing and the said ball terminal, a guard ring fixed to and surrounding the knuckle, and a guard ring fixed to the inner side of the hub and receiving the first-named guard ring.

In testimony whereof I affix my signature in presence of two witnesses.

WILLIAM J. EVANS.

Witnesses:
 EDWARD PETERSON,
 GEO. H. HARMON.